United States Patent [19]

Noreve et al.

[11] Patent Number: 5,414,466
[45] Date of Patent: May 9, 1995

[54] DEVICE FOR THE CORRECTION OF IMAGES FROM A SENSOR CAUSING A PERIODIC NOISE, AND IMPLEMENTATION METHOD

[75] Inventors: Xavier Noreve; Michel Terre, both of Paris; Luc Fety, Viels-Maisons, all of France

[73] Assignee: Thomson-TRT Defense, Paris, France

[21] Appl. No.: 13,205

[22] Filed: Feb. 1, 1993

Related U.S. Application Data

[63] Continuation of Ser. No. 695,452, May 3, 1991, abandoned.

[30] Foreign Application Priority Data

May 15, 1990 [FR] France ................. 90 06034

[51] Int. Cl.⁶ ..................... H04N 5/335; H04N 3/14
[52] U.S. Cl. ..................... 348/241; 348/246; 348/247; 348/248
[58] Field of Search .............. 358/213.15, 213.17, 358/213.18, 213.24, 213.27

[56] References Cited

U.S. PATENT DOCUMENTS

| | | | |
|---|---|---|---|
| 4,628,352 | 12/1986 | Boue | 358/93 |
| 4,748,507 | 5/1988 | Gural | 358/213.28 |
| 4,920,428 | 4/1990 | Lin et al. | 348/255 |
| 5,041,913 | 8/1991 | Abe | 358/213.15 |
| 5,047,861 | 9/1991 | Houchin et al. | 358/213.15 |

OTHER PUBLICATIONS

Proceedings of the IEEE International Conference on Acoustics, Speech, and Signal Processing, Mar. 26-29, 1985, vol. 2 of 4, pp. 684–687, K. M. Tao et al., "Adaptive Noise Cancelling Applied to Image Restoration".

Computer Graphics and Image Processing, vol. 16, No. 3, Jul. 1981, pp. 287–295, V. Ralph Algazi et al., "Radiometric Equalization of Nonperiodic Striping in Satellite Data".

Proc. IEEE Intl. Conf. on Acoustics, Speech, & Signal Processing, Mar. 26-29, 1985, vol. 2 of 4, pp. 684–687, K. M Tao et al., "Adaptive Noise Cancelling Applied To Image Restoration".

*Primary Examiner*—Michael T. Razavi
*Assistant Examiner*—Bipin Shalwala
*Attorney, Agent, or Firm*—Oblon, Spivak, McClelland, Maier, & Neustadt

[57] ABSTRACT

The analysis of an image of the field of observation from a heat camera by bands of n lines prompts the appearance of streaks or "striping" in certain zones of the image, all these zones constituting a "striping space". The device for the implementation of the method includes means to determine a base of orthonormal functions H and V, generating a vector space of functions for which the values taken, at each point of the image, represent the luminance values of all the types of striping, means to modelize the striping exhibited by the image in determining the coefficients of distribution of this striping on the basic functions, means to synthesize the striping, in determining the luminance values of the striping from the coefficients of correlation and from the values of he basic functions, and, finally, means to substract the luminance values of the synthesized striping from the luminance values of the initial image.

5 Claims, 4 Drawing Sheets

DEVICE FOR THE CORRECTION OF IMAGES FROM A SENSOR CAUSING A PERIODIC NOISE, AND IMPLEMENTATION METHOD

This application is a continuation of application Ser. No. 07/695,452, filed on May 3, 1991, now abandoned.

BACKGROUND OF THE INVENTION

1. Field of the Invention

The present invention relates to the field of the correction of images from a sensor causing a periodic noise. It is more particularly designed for the correction of the striping defects created in heat cameras through a sensor such as this, and an object of the invention is method for the "destriping" of images by adaptive processing and a device for the implementation of such a method.

2. Description of the Prior Art

The chain for the display of images taken by a heat camera has the following elements: objective—scanning module—detection system—signal processing device—display device.

The detection system is constituted by a matrix sensor formed by a 2D mosaic of n lines of elementary, photovoltaic or photodetective sensors, cooled to 77° K. to reduce the thermal noise to the minimum. In FIG. 1, the detector or sensor mosaic 1 of the reference camera is constituted by $n=11$ groups of four elementary cells. The groups of cells of two successive lines are offset for technological reasons, and the whole set of groups is in three columns. This configuration enables the analysis of one pixel per group of cells. An optic system 2, formed by mirrors (M1, M2, M3) and an output lens LS, projects an elementary zone A of the image A on the sensor 1. This image A is formed by the objective O of the camera from the scene observed. This zone Z describes the field of observation of the camera by means of a double scanning operation:

a horizontal scanning, prompted by a pyramidal mirror 3 with twelve facets;

a vertical scanning, done with a pivoting plane mirror 4.

The image, with a format of $24 \times 36$ pk mm$^2$, is analyzed in 47 bands of 11 lines and divided into 780 pixels per line for 517 useful lines (giving 780 pixels on $11 \times 47$ lines for the reference camera and, more generally, Q pixels on nxP lines).

Owing to the inhomogeneous response of electronic components (preamplifiers, capacitors or delay lines) associated with the sensor cells, combined with inhomogeneities having optic causes (periodic variations in the sighting axis) and mechanical causes (driving of the pivoting mirror for the vertical scanning), streaks appear on the display device which take the form of the "striping" effect and have the following specific characteristics:

inhomogeneity along the lines in a dome-shaped curve of luminance;

inhomogeneity along the columns from top to bottom of the image;

offset of the domes from one line to the next one;-HERE inhomogeneity in n-line periods on the image.

These characteristics show that the striping defect is chiefly related to the structure of the matrix-shaped detection system and to the associated scanning module with which the heat cameras are fitted out. The analysis of the image in bands of n lines by means of such a system prompts the appearance, on the final image, of zones wherein, for each pixel, the luminance values resulting from the striping defect are superimposed on the luminance values of the fault-free image. All these zones define a striped space.

Different approaches have been put forward to eliminate these striping defects by the "destriping" of the image. These approaches include, in particular:

Yasuoka's destriping method (cf. T. Suzuki & H. Ogura ed., *Proceedings of the 1984 International Symposium on Noise and Clutter Rejection in Radars and Imaging Sensors*, c IECE 1984), in which the image is modelized on the basis of the following hypothesis: the mean of the luminance level of a "destriped" image line may be expressed as a linear combination of the means of the luminance levels of a band centered on this line.

destriping by defocusing: the sighting line of the camera is tilted, or the objective is masked, so that a pure striped image is made to appear on a uniform gray background to be subtracted from the image delivered by the camera.

Such approaches are not satisfactory:

in the former example, the striping is only partially attenuated and the method prompts the appearance of a secondary striping, in the form of flashes or blurred features, owing to the erroneous interpretation of the breaks in continuity (corresponding to sudden variations of luminance in the landscape);

in the latter example, the proposed approach requires the periodic updating of the correction to be made, whence a periodic interruption of emission incompatible with the continuous use of the camera.

SUMMARY OF THE INVENTION

The invention seeks to circumvent these problems by proposing a method for the destriping of images by adaptive processing in real time in order to restore a corrected image without any appearance of secondary striping.

To this effect, the invention proposes a method for the correction of striping in images coming from a sensor causing a periodic noise, where the striping defect results from the analysis of the image in bands of n lines by means of a matrix sensor and prompts the appearance, on the image, of zones wherein, at each pixel, the luminance values due to the defect are superimposed on the luminance values of the image, all these zones constituting a striped space, wherein said method comprises the following steps:

the determination of the striped space by identification of the luminance values of the striping with the values taken by the polynomial functions of a vector space of functions generated by a base of decorrelated and formed functions;

the modelization of the striping in this space of polynomials by determining the coefficients of distribution of the striping on each function of the base from the luminance values of the image and from the values of the functions of the base;

the synthesis of the striping by determining the luminance values of the striping from the coefficients of correlation and from the values of the functions of the base, and the subtraction of the synthesized striping from the initial image by subtraction of this synthesized striping from the luminance values of the initial image.

The invention also concerns a device for the implementation of such a method.

BRIEF DESCRIPTION OF THE DRAWINGS

The present invention shall be understood more clearly and other features and advantages shall appear from the following description, made with reference to the appended drawings, of which.

DESCRIPTION OF PREFERRED EMBODIMENTS

Figures 1A, 1B:
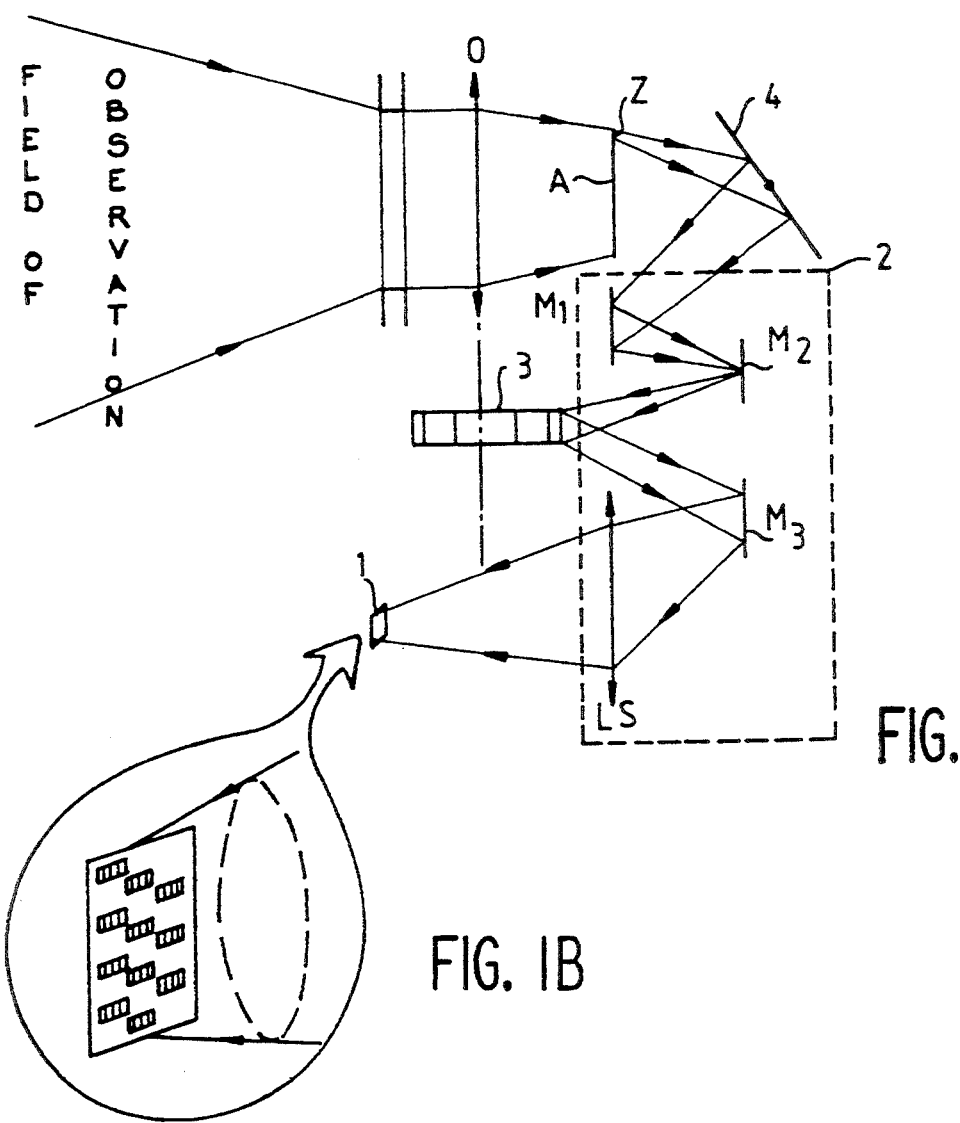
FIG. 1 (already commented upon) shows the structure of the scanning module and of the detection system associated with a reference heat camera.
Figure 2:
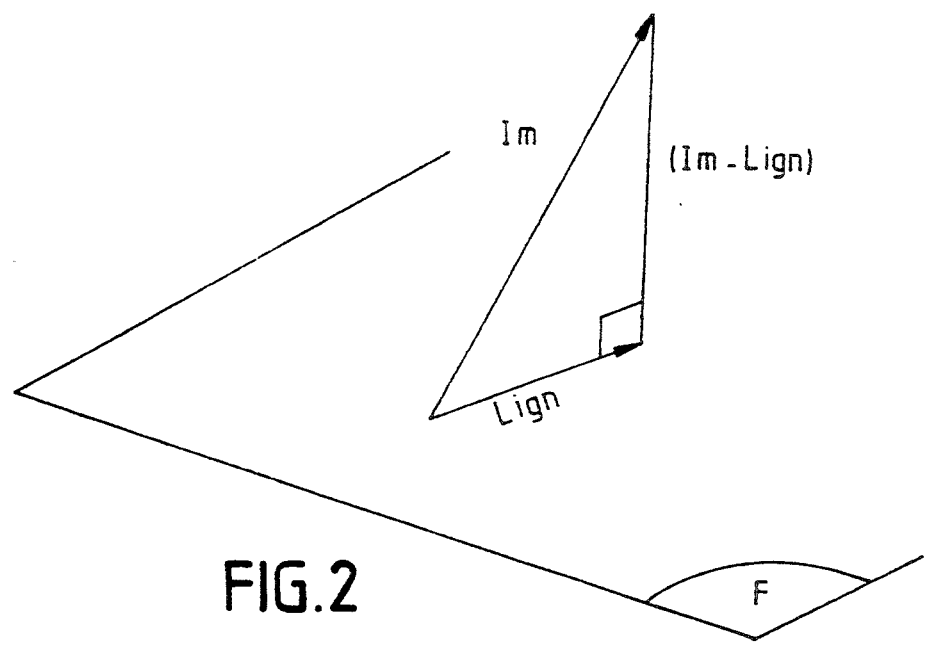
FIG. 2 is a drawing illustrating the basic principle of the invention.

FIG. 2 illustrates the basic principle underlying the invention. An image Im is represented by a vector function, the coordinates of which, in a given window, represent all the luminance values of this image (hereinafter, the vector function is identified with the image Im). Let E be the vector space of these functions, and F be the vector sub-space of E, generated by all the functions defining striped images. On the basis of these definitions, the following are the underlying goal of the method of the invention:

the defining of a striped space F in such a way that it is as restricted as possible, so as not to encompass the unstriped image, and as huge as possible so that it contains every type of striping;

the extracting of the striping, referenced Lign in FIG. 2, from the image Im by projecting the image Im in this space F;

the synthesizing of the striping from the preceding step, and its subtraction from the initial image in order to obtain an destriped image.

The method according to the invention therefore hinges on three basic steps:
  the definition of a striped space;
  the modelization of the striping;
  the synthesis and subtraction of the modelized striping.

With respect to the first point, the striped space is defined in relation to the striping characteristics capable of being physically exploited, namely:

its development in the shape of a dome in lines and columns;

its periodic inhomogeneity in lines (11-line periods in the case of the reference heat camera, n-period lines more generally).

The chosen assumption, which analytically integrates these parameters, identifies the striped sub-vector space and the vector space of the following functions:

polynomial functions with values in lines and columns: the dome shapes of the luminance values in lines and columns are completely described by the linear combinations of a set of basic polynomials, respectively with line values and column values;

periodic functions: the horizontal periodicity should be recovered on the functions in lines and, in particular, on the basic polynomials generating these functions. It therefore suffices to define a base of polynomials in lines on a band of n lines so that, by identical reproduction (on 47 bands in the example illustrating the invention and, more generally, on P bands) a base of polynomials in lines is defined on the entire display window;

and centered functions: in order to preserve the mean value of luminance of the image linewise, during the subsequent subtraction step, the striping has to be defined on the basis of centered polynomials, i.e. polynomials for which the mean value on a line or on a column is null.

The approach adopted, following these considerations, is that of composing the striped space by the superimposition of:

a horizontal striping with a period character that is defined by P identical reproductions of a band of n lines of striping;

a vertical striping designed to weight the horizontal striping in order to take account of the vertical inhomogeneity of the P bands of n lines from the top to the bottom of the image.

To express this composition in terms of vector spaces of functions with values in lines and columns, it is necessary to choose a base formed by a first base of horizontal striping and a second base of vertical striping.

The horizontal striping base consists of:

n centered 0 degree polynomials (generating constant polynomials) named ($B_1$, $B_2$; ... $B_i$; ... ; $B_n$). These polynomials B are such that:

$B = 1$ for each point of the line i, with i ranging from 1 to n $B_i = 1$ for each point of the line n.

$B_i = 0$ on all the other lines.

The following matrix B summarizes the values taken by the basic vectors of the constant polynomials:

TABLE 1

$$B = \begin{pmatrix} B_1 & B_2 & \ldots & B_i & \ldots & B_{n-1} & B_n \\ 1 & & & & & & \\ & 1 & & & & 0 & \\ & & \ddots & & & & \\ & 0 & & & \ddots & & \\ & & & & & 1 & \\ -1 & -1 & \ldots & -1 & \ldots & -1 & 0 \end{pmatrix}$$

Since the polynomial $B_n$ is identically null, the space of the constant and centered polynomials is well described by $n-1$ polynomials ($B_1, \ldots ; B_{n-1}$), as would have been expected (i.e. with the loss of one degree of freedom owing to their centering).

$(n-1)p$ 1st degree to pth degree centered polynomials, generating the polynomials centered in lines. These basic polynomials can be written from the preceding $B_i$ polynomials as follows:

TABLE 2

| |
|---|
| $B_1 X$ ; ... , $B_i X$ ; ... ; $B_{-1} X$ |
| $B_1 X^2$ ; ... ; $B_i X^2$ ; ... ; $B_{n-1} X^2$ |
| .......................... |
| $B_1 X^j$ ; ... ; $B_1 X^j$ ; ... ; $B_{n-1} X^j$ |
| $B_1 X^p$ ; ... ; $B_i X^p$ ; ... ; $B_{n-1} X^p$ |

The vertical striping base is defined from the 1st degree to qth degree centered polynomials determined on the basis of the preceding ones to generate the polynomials centered in columns: it consists of $(n-1)q$ polynomials defined from the $n-1$ 0-degree$_k$ polynomials having an expression of the type $B_j Y$, but also $(n-1)pq$ polynomials defined from the $(n-1)p$ polynomials of table 2 and having an expression of the type $B_k X^i Y^j$. The number of basic polynomials in columns is therefore $(n-1)(p+1)q$.

In short, the horizontal striped base generating the horizontal striped space contains $(n-1)+(n-1)p=(n-1)(p+1)$ polynomials, and the base generating the complete, horizontal and vertical, striped space contains a total number of polynomials equal to:

$$(n-1)(p+1)+(n-1)(p+1)q=(n-1)(p+1)$$

The analytical expressions of the basic polynomials in X and Y are determined, as a function of the variables in lines and columns x and y respectively, so as to form an orthonormal base of decorrelated and normed functions. This is choice justified by the simplification of the subsequent computations that it generates.

The decorrelation is obtained by means of Cholesky's standard decorrelation algorithm, and the normalizing is obtained by division by their variance: the function x is decorrelated from the function 1, then the function $x^2$ is decorrelated from the functions 1 and x' (x decorrelated from 1) and so on and so forth. This operation is performed once and for all, and does not affect the computation load.

A base of functions $(f; f'; f''; \ldots; f^{(k)}; \ldots)$ or $f^{(k)}$ is thus defined. It consists of:

normed functions generating the horizontal striping and forming a first base $(f_H^{(k)})$; these functions, with values on each of the n lines, are decorrelated with respect to one another for all the j points of each line, with j varying from 1 to Q;

normed functions generating the vertical striping and forming a second base $(f_V^{(k)})$; these functions, with values on the Q columns every n lines, are therefore decorrelated with respect to one another every n lines, i.e. for the i modulo n points, i varying from 1 to nP (for example, the functions decorrelated on the 1 modulo n lines form a first series etc.). This decorrelation to the "nth" degree expresses the definition given to the vertical striping from the definition of the horizontal striping.

The modelization of the real striping is the object of the second step of the method. This modelization can be broken down into a modelization of the horizontal striping and a modelization of the vertical striping, by a search for the distribution coefficients, or correlation coefficients, or coordinates of the horizontal (and, respectively, vertical) striping on each function of the base $(f_H^{(k)})$ with values on n lines (and on the base $(f_H^{(k)})$ respectively, with values at every nth line of the Q columns).

Before describing the operation by which this modelization can be done, a formalistic approach is presented in order to substantiate the validity of these operations and their sequence. Referring to FIG. 2, it can be seen that the striping Lign can be attained by the orthogonal projection of the image Im in the striped space. If it is then noted that the striping Lign is such that it makes the module (Im-Lign) minimal, it is possible to modelize the real striping on the above-defined vector space from:

the luminance values of the image Im;

the centered base $(f^{(k)})$ formed by two bases $(f_H^{(k)})$ and $(f_V^{(k)})$ generating the horizontal and vertical striped vector space.

To achieve the breakdown of the striping on this base $(f^k)$ from the breakdown, on this same base, of the luminance values of the image Im, it can be concluded, from the above observations, that it is enough to minimize the quantity (Im-Lign). To this end, the approach taken is that of minimizing this quantity, by a least squares type of method, in seeking the vector Lign of the striped space that ascertains that $(Im-nign)^2$ is minimal, on the basis of a sufficient number of luminance values.

If we base our reasoning, to begin with, on the constant centered polynomials in lines $(B_i)$, we can easily understand the mechanism that will enable us to arrive at the coordinates $\theta$ of the constant striping L, such that:

$$L = \sum_i \theta_i B_i$$

Let $\theta$ be the matrix of the coordinates of the striping L, I is the matrix of the coordinates of the image on the striped space and B is the matrix of the basic polynomials. According to the procedure set forth, it is then necessary to find $\theta$ such that the mathematical expectation $E(I-\theta B)^2$ is minimal.

To do this, it is enough to cancel the derivative of this expression:

$$2E(I-\theta)B^5=0$$

this results in:

$$\theta=(BB^5)^{-1}E(B^5 I) \qquad \text{formula I}$$

E(I) represents the averages of the luminance values of the image defined on the basis of the striped space. This expression may be written as follows:

$$\begin{pmatrix} I_1 \\ \vdots \\ I_i \\ \vdots \\ I_n \end{pmatrix}$$

with $I_i$=mean of the luminance value of the image on the ith line reduced to the basic polynomial $B_i$.

In replacing E(I) by its expression limited to the 11th order and B by the expression developed in table 1, we get:

$$E(B^t I) = \begin{pmatrix} \bar{I}_1 \\ \vdots \\ \bar{I}_{10} \end{pmatrix} \begin{matrix} \bar{I}_{11} \\ \text{and} \\ \bar{I}_{11} \end{matrix}$$

$$(BB^t)^{-1} = \frac{1}{11} \begin{pmatrix} 10 & & & -1 \\ & \ddots & & \\ & & \ddots & \\ -1 & & & 10 \end{pmatrix}$$

The simplicity of the writing of $(BB^t)^{-1}$ provides an *a posteriori* justification of the use of a base of orthonormal functions.

The result of the above expressions is that the coordinate of the striping $\theta i$ on the ith line is given, starting from the formula I, by the expression:

$$\theta_i = \frac{1}{11}[-(I_i - I_{11}) - (I_2 - I_{11}) - \ldots$$
$$+ 10(I_i - I_{11}) - \ldots - (I_{10} - I_{11})]$$

giving $$\theta_i = I_1 - \frac{1}{11} \Sigma I_1 \quad \text{formula II}$$

Thus, each striping coordinate, on the striping vector space of the constant, centered polynomials in lines is equal to the mean of luminance of the image on the corresponding line minus the mean of the luminance of the image on all the lines.

By broadening the scope of this conclusion to the striping vector space of the functions centered in lines and in columns, defined on the basis of the orthonormal base $(f^{(k)})$, the formula II becomes:

$$\theta^{(k)}_i = M_i^{(k)} - M_H^{(k)}$$

and $\theta^{(k)}_j = M_j^{(k)} - M_V^{(k)}$ for the coefficients of correlation of the horizontal striping (and vertical striping respectively) defined in relation to the base $f_H^{(k)}$ (and $f^{(k)}_V$ respectively).

In these expressions, $M_i^{(k)}$ (and $M_j^{(k)}$ respectively) represent the averages of the coefficients $a_{ij}$ of the luminance of a point (i, j) located on the ith line and jth column of the image on the Q pixels of the ith line (and on the nP pixels of the jth column respectively).

$$M_i^{(k)} = \frac{1}{Q} \Sigma a_{ij}$$

$$M_j^{(k)} = \frac{1}{nP} \Sigma a_{ij}$$

The coefficients $a_{ij}$ can be immediately obtained by the ratio of luminance of the image $I_{ij}$ and of the value of the function f(k) at the point considered, whence:

$$M_i^{(k)} = \frac{1}{Q} \sum_j l_{ij}/f^{(k)}_{(j)} \text{ et}$$

$$M_j^{(k)} = \frac{1}{nP} \sum_i l_{ij}/f^{(k)}_{(i)}$$

Finally, $M^{(k)}_H$ (and $M_V^{(k)}$ respectively) are equal to the mean of the $M_i^{(k)}$ (and $M_j^{(k)}$ respectively) of the horizontal striping space on all the n lines (and respectively on all the Q lines of the vertical striping space).

$$M_H^{(k)} = \frac{1}{n} \Sigma M_i^{(k)}$$

and $$M_V^{(k)} = \frac{1}{Q} \Sigma M_j^{(k)}$$

It follows, from the above, that to cover the second step of the method of the invention, namely the modelization of the striping, the following sequence of operations is carried out:

the determination of the base of the decorrelated and normed polynomial functions that generate the striping space according to the procedure adopted. It is possible to limit this base solely to the functions centered in line: the striping space considered is then limited to the horizontal striping which, actually, is the most visible one. However, this base may be extended to the functions centered in columns and the striping space considered is then complete;

the memorization of the complete image: for the modelization of the complete striping, it is necessary to memorize all the luminance values of the image since the modelization of the vertical striping concerns the entire image. The accumulation of the image, designed for the modelization of the horizontal striping, is then carried out on the basis of this image memory;

the accumulation of P bands of n lines of the image on a band of n lines: this accumulation makes it possible to amplify the "dome" effects of the horizontal striping with respect to the background noise;

the determination of the coefficients of correlation of the striping $\theta_i^{(k)}$ (and $\theta_j^{(k)}$ respectively) on each function of the base $(f^{(k)})$ and for each of the lines i (and the columns j respectively) by computing the difference between the means $M_i^{(k)}$ and $M_H^{(k)}$ ($M_j^{(k)}$ and $M_V^{(k)}$ respectively). Depending on whether the base $(f^{(k)})$ has only the elementary functions in lines $(f_H^{(k)})$ or all the functions in lines and in columns $(f_H^{(k)}, f_V^{(k)})$, the modelization concerned is that of the horizontal striping or of the complete striping.

The coefficients of correlation of the horizontal destriping, determined from the condensed image, have to be divided by P and have to be copied out P times to give coefficients $\theta_i^{(k)}$ that can be exploited in the step for synthesizing the horizontal striping.

The third step consists precisely in synthesizing the horizontal or complete striping model defined earlier above by means of the coefficients $\theta^{(k)}$, namely $\theta_i^{(k)}$ and $\theta_j^{(k)}$ respectively, on the basic functions $f^{(k)}$, then in subtracting the synthesized striping image from the initial image.

To create the horizontal striping image, it is necessary to define the luminance value $\lambda_{ij}$ of each pixel (i,j) of the ith line modulo n and jth column, with i varying from i to nP and j from 1 to Q. Each elementary function of the horizontal striping base $f_H^{(k)}$ (j) contributes to the striping at this point with the coordinate of the striping on this function, namely $\theta_i^{(k)}$; thus:

$$\lambda_{ij} = \sum_k \theta_i^{(k)} f_H^{(k)}(j)$$

To create the complete striping image, it is necessary to add the luminance component due to the vertical striping: each function $f_V^{(k)}$ of the vertical striping base, with values on the ith lines modulo n, also contributes to the striping of the point (i, j) by means of its coefficient $\theta_j^{(k)}$; the luminance value of the complete striping therefore has the expression:

$$\lambda_{ij} = \sum_k \theta_i^{(k)} f_H^{(k)}(j) + \sum_k \theta_j^{(k)} f_V^{(k)}(i)$$

The implementation of the method of the invention may take two forms organized according to the same principle, depending on whether the card made is a horizontal destriping or a complete destriping card.

Figure 3:
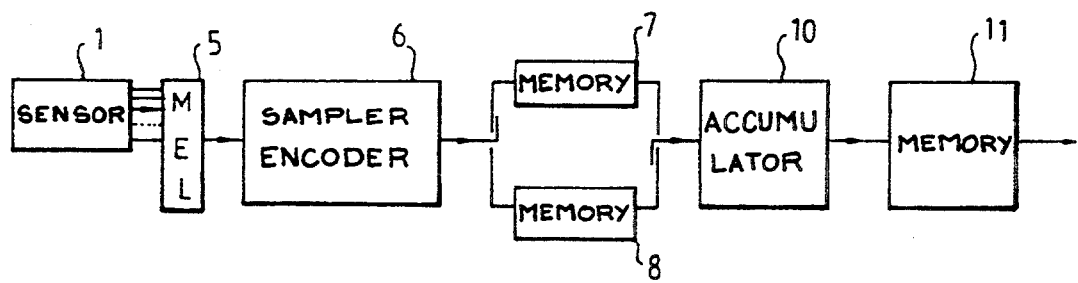
FIG. 3 shows the processing chain of the signal providing for the accumulation of the image.

In particular, these two shapes bring into play a processing chain capable of providing for the accumulation of the image, and hence of the striping on a band of 11 lines (more generally n lines). The horizontal striping, concentrated, modelized and synthesized according to the method of the invention, is defined on this same band. FIG. 3 shows the diagram of this processing chain. A linear electronic module (MEL) 5 receives each of the eleven signals coming from the eleven groups of the four sensor cells forming the sensing mosaic to preamplify and synchronize them. The output of the module 5 is applied to a sampler 5 that samples and digitizes each signal by every known digital method. The item of luminance data is then stored in one of the random-access memories 7 or 8 while the value stored in the other random-access memory is read in 64 microseconds. The values read successively in the memories 7 and 8 are transmitted to an accumulator 10 capable of carrying out the addition, on 11 lines, of the 47 bands of luminance values corresponding to a complete scanning of the field of vision. These memories are stored in a memory 11 with an adapted capacity.

Figure 4:
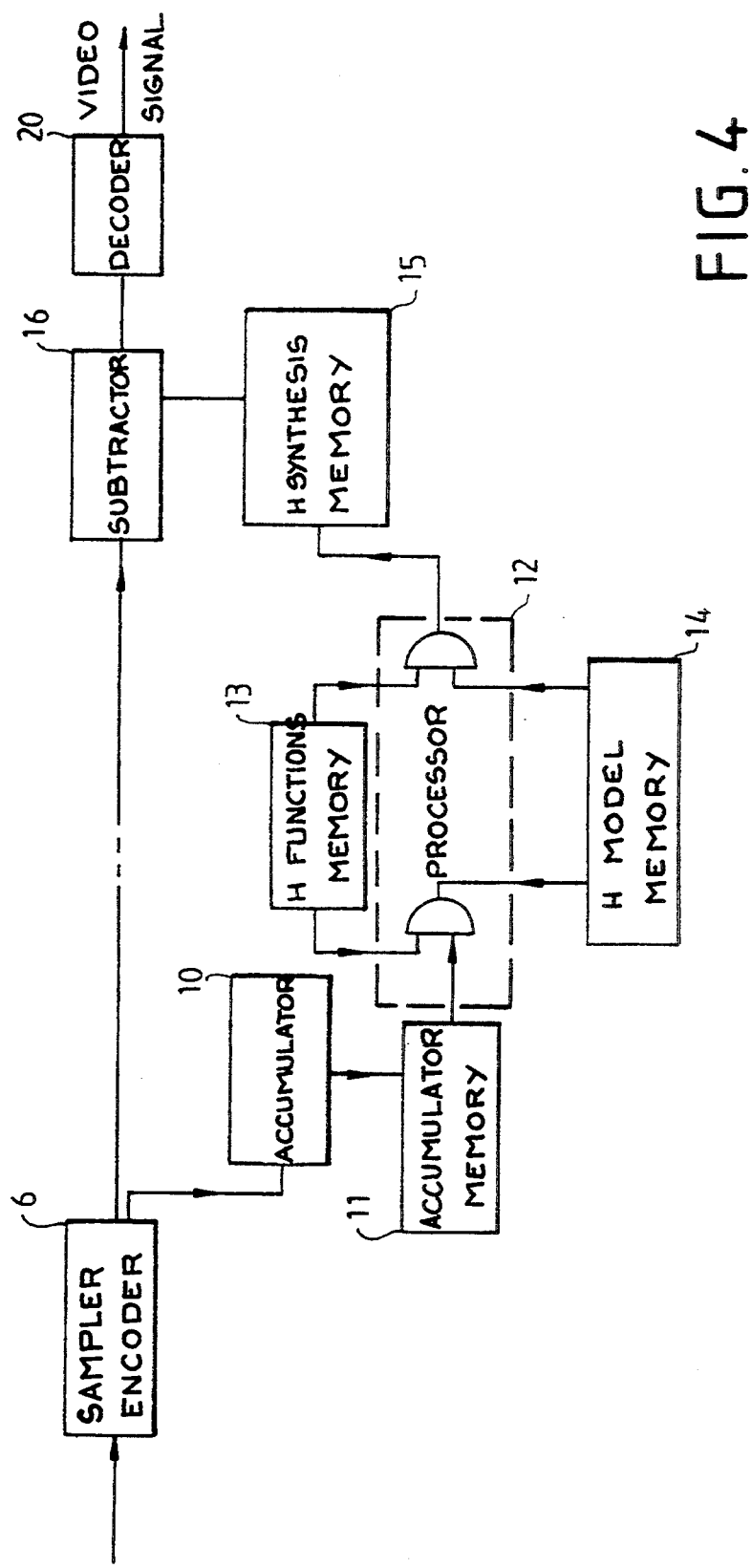
FIG. 4 shows a first embodiment of the device for the implementation of the method according to the invention.

The device that implements only horizontal destriping is illustrated in FIG. 4. This implementation is organized around a central signal processor which initially computes the orthonormal functions of the horizontal striping base $(f^{(k)}_H)$ according to the method explained. The value of these functions, stored in a memory 13, are successively addressed to the processor 12 so that, on the basis of these values $f^{(k)}_H(j)$, with j varying from 1 to Q, and of luminance values $l_{ij}$ given by the memory of the accumulator 11, it determines the values of the coefficients of correlation $\theta_i^{(k)}$ of the horizontal striping model. These values $\theta_i^{(k)}$, after division by P (P=47 for the reference camera) are stored in a memory 14. This memory 14 then successively sends the processor 12 coefficients making it possible to determine the luminance values $\lambda_{ij}$ of the synthesized horizontal striping, by combination with the functions $f_H^{(k)}(j)$. The values $\lambda_{ij}$ are stored in a synthesizing memory 15 on n lines (11 lines for the reference camera). Finally, a subtractor 16 can be used for the subtraction, in a synchronized way, of the luminance values of the synthesized horizontal striping, stored in the memory 15, from the luminance values of the image, sampled and digitized on n lines. The luminance values of the destriped image are converted into video signals by decoding through the decoder 20.

Figure 5:
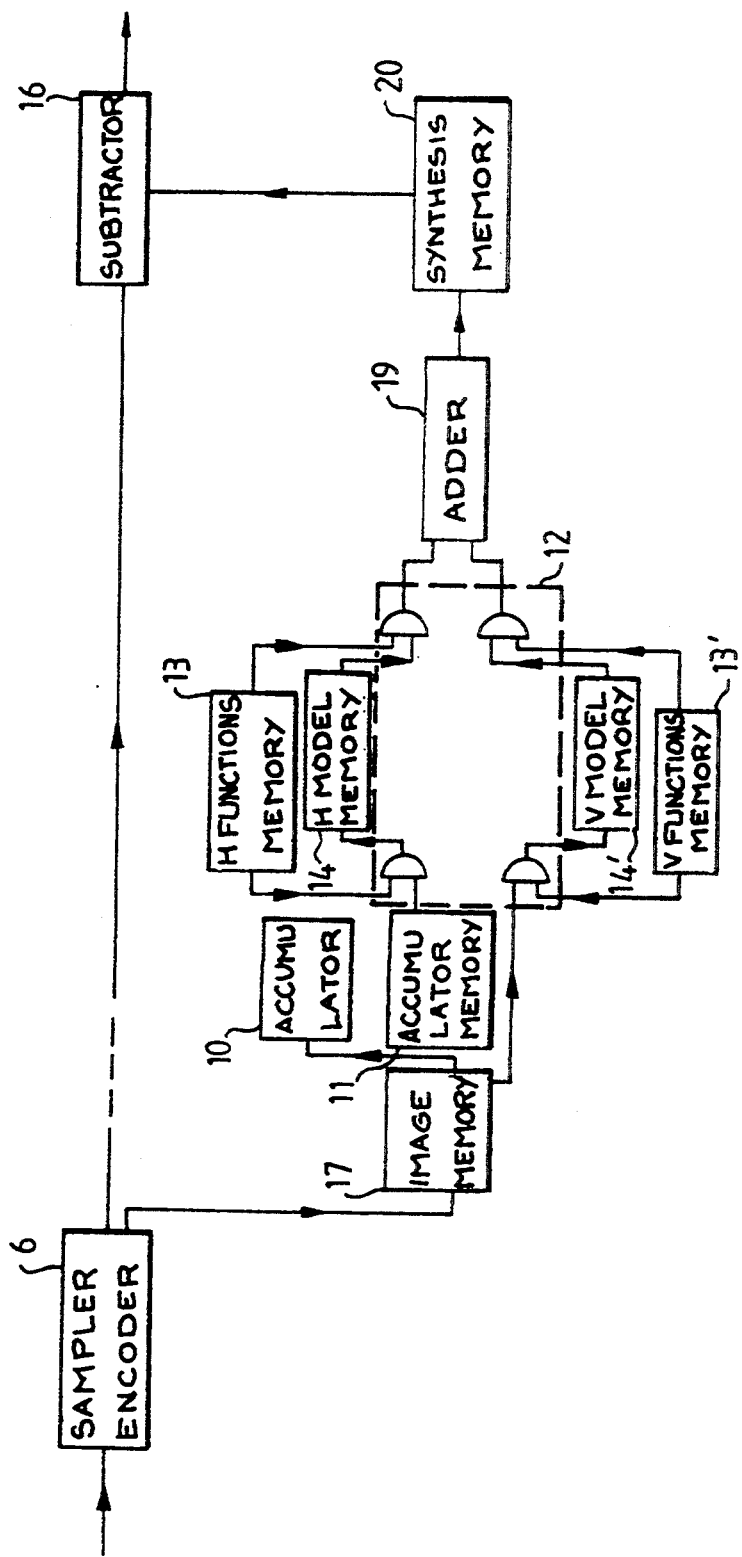
FIG. 5 shows a second embodiment of said device.

The device for implementing the complete destriping method is described with reference to FIG. 5. It has a processing chain identical to that of the earlier device for horizontal destriping, up to the synthesizing memory. However, the luminance values of an image, determined by the sampler-encoder, are firstly demultiplexed to create two addressing channels, including one channel for horizontal destriping by initial storage of these luminance values in the accumulator memory 11.

With respect to the vertical destriping, the coefficients of correlation $\theta_j^{(k)}$ of the vertical striping model are stored in a memory 14'. They are stored therein after having been determined by the processor 12. This determination is done by sequential addressing of the luminance values given by the image memory 17 by demultiplexing and sequential addressing of the values of the functions of the vertical destriping base $(f_V^{(k)}(i)$, i varying from 1 to nP modulo n, stored in a memory 13'. The luminance values of the synthesized vertical striping are then determined by sequential addressing of the coefficients of the vertical striping module stored in the memory 14' and of the values of the functions $f_V^{(k)}(i)$ given by the memory 13'. The luminance values of the synthesized horizontal striping, copied out P times by means of a copying-out device (not shown), are successively addressed to an adder 19 to be added to the luminance values of the synthesized vertical striping addressed successively to the same adder 19. After storage in a synthesizing memory 20, the added-up values of the synthesized striping are then addressed, by successive bands of n lines, to the subtractor 16 to be subtracted from the luminance values of the initial image as sampled and digitized on n lines by the sampler 6.

The invention is not restricted to the exemplary embodiments described and shown herein. In particular:

the position of installation of the correction device, which takes the form of a destriping card, is adapted to the structure of the camera. It is located in the electronic pack of the camera which already contains the control card, the channel cards and the video cards. The correction signal, after analog conversion, may also act on the analyzing head, in order to prevent problems of saturation of the analog signals.

the invention is not restricted to the destriping described, formed by a periodic horizontal destriping and a vertical destriping: it is enough to define a new destriping base $(f^{(k)})$ to modelize and synthesize any type of striping.

The invention can be applied to processing in real time. To improve its performance characteristics, a VLSI (very large-scale integration) circuit may be used instead of the signal processor.

What is claimed is:

1. A method for the correction of striping in a thermal image wherein the striping defect results from the analysis of said image and in the bands of a plurality of lines, now number, by means of a matrix sensor and prompts the appearance, on said image, of zones wherein, at each pixel, the luminance values due to the defect superimposed on the luminance values of said image, all of these zones comprising a striped space, wherein said method comprises the steps of:
   converting a thermal image into electrical signals by employing a matrix thermal sensor;.
   storing in a memory numerical values indicative of an image received from said matrix thermal sensor;
   determining from said stored values, contained in said memory, of the image containing said striped space, an identification of the luminance value of the striping; with the taking of values by a global polynomial functions of a vector space of functions generated by a base of decorrelated and normed functions of said stored values of said image;
   modelizing the striping in said space of polynomials, by determining the coefficients of distribution of the striping of each function of the base from the luminance values of the stored image and from the values of each of the functions of said base;

synthesizing the striping by determining luminance values of the striping from the coefficients of correlation and from the values of the functions of said base by said processor;

subtracting the synthesized striping from the initial image by subtracting the synthesized striping from the luminance values of the initial image; and outputting a video signal indicative of the corrected video image for further display.

2. A destriping method according to claim 1, applied to horizontal destriping, wherein said method comprises the following steps:

accumulating the luminance values of P bands of n lines of the image in a single band of n lines;

determining a space of horizontal striping by the determining of a horizontal striping base of functions normed and decorrelated with respect to one another on each of the j points of a condensed image line, j varying from 1 to Q;

modelizing the horizontal striping on this space by the determining of the coefficients of correlation of the model on each function of the horizontal striping base, for each line i, i varying from 1 to n, each of these coefficients being equal to the mean of the luminance values at each point of the line i of the condensed image defined on the basis of the values taken by the basic function considered at this point, minus the mean of the luminance values of the image taken on all the n lines and defined on the basis of the values of the basic function considered, the coefficients having to be divided by P to be exploited in the next step;

synthesizing the horizontal striping of the horizontal striping space by the determination of the luminance values of each point of the horizontal striping, each of these luminance values being equal to the sum of the products of the coefficients of correlation at this point on a given function by the value of this function at this point;

subtracting the horizontal striping image thus synthesized from the initial image.

3. A destriping method according to claim 2, applied to horizontal and vertical destriping, comprising the following steps:

memorizing the luminance values of P bands of the complete image, firstly, and the accumulation of these values on a band of n lines, secondly;

modelizing a striping space formed by a horizontal striping space and a vertical striping space, the former space being generated by the horizontal striping space according to claim 2 and the latter space being generated by a vertical striping base of functions, normed and decorrelated with respect to one another at each point i modulo n of an image column;

modelizing the horizontal striping and the modelization of the vertical striping on the vertical striping space by the determining of the coefficients of correlation of the model with each function of the vertical striping base, for each column j, j varying from 1 to Q, each coefficient being equal to the mean of the luminance values at each of the nP points modulo n of the column j defined on the basis of the values taken by the base function at this point, minus the mean of the luminance values of the image taken on all the Q columns for each of the nP points modulo n and defined on the basis of the values of the corresponding basic function;

synthesizing the horizontal striping and synthesis of the vertical striping on the vertical striping space by the determination of the luminance values of each point of the vertical striping, each of these luminance values being equal to the sum of the products of the coefficients of correlation at this point with a basic function of vertical striping decorrelated at this point by the value of this function at this point;

subtracting the horizontal destriping image and of the vertical destriping image thus synthesized from the initial image.

4. A destriping device according to claim 1, applied to horizontal destriping, wherein said device further comprises;

a signal sampling/encoding device, wherein digitized values of which are addressed to an image accumulator on n lines coupled to an accumulator memory, a signal processor to determine the basic functions of the horizontal striping space and to combine the values of these functions, stored in a memory, with the luminance values stored in the memory so as to determine the coefficients of correlation of the horizontal striping model, memorized in a memory;

a memory to store the luminance values of a horizontal striping synthesis determined by the processing by addressing of the memories; and a subtractor to perform the subtraction, in a synchronized way, of the luminance value of a point of the synthesized horizontal striping from the luminance value of the image at the same point.

5. A destriping device according to claim 4, applied to complete, horizontal and vertical, destriping, further comprising:

an image memory to contain all the luminance values of an image addressed by the sampling/encoding device, said luminance values being demultiplexed to create two addressing channels, a horizontal destriping channel by means of a processing chain;

a vertical destriping channel including a memory for the storage of the basic functions of the vertical destriping determined by the processor;

a memory for the storage of the coefficients of correlation of the vertical striping model determined by the processor by sequential addressing of the luminance values of the memory, an adder to carry out the addition, by parallel addressing, of the luminance values of the synthesized vertical striping, determined by the processor, by sequential addressing of the coefficients stored in the memory and of the values of the functions stored in the memory, and of the luminance values of the synthesized horizontal striping copied out in a copying-out device, a synthesis memory for the storage of the luminance values of the horizontal and vertical stripings added up in the adder; and a subtractor to carry out the subtraction, by successive addressing of bands of n lines of values coming from the memory, of the luminance values of the synthesized striping from the luminance values of the initial image, sampled and digitized on n lines by the sampler.

* * * * *